3,681,287
SILICEOUS MATERIALS BOUND WITH RESIN CONTAINING ORGANOSILANE COUPLING AGENT
Lloyd H. Brown, Crystal Lake, Andrew P. Dunlop, Riverside, and Daniel S. P. Eftax, Barrington, Ill., assignors to The Quaker Oats Company, Chicago, Ill.
No Drawing. Filed Mar. 3, 1971, Ser. No. 120,736
Int. Cl. C08g 1/00; C08f 5/00
U.S. Cl. 260—67 FA          8 Claims

ABSTRACT OF THE DISCLOSURE

This invention relates to a method of binding siliceous materials with an acid catalyzed thermosetting resin containing an organosilane of the formula:

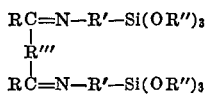

wherein R is a monovalent hydrocarbon radical free of aliphatic unsaturation, or hydrogen; R' is a divalent aliphatic hydrocarbon radical; R" is alkyl, aryl, heterocyclic, and substituted derivatives thereof; and R''' is a divalent hydrocarbon radical free of aliphatic unsaturation.

BACKGROUND OF THE INVENTION

Field of the invention

This invention concerns a process for improving the structural strength of thermosetting resin bonded siliceous materials. More particularly, the invention is concerned with a novel organosilane modified thermosetting resin for binding siliceous materials.

Description of the prior art

The use of thermosetting resins as binders for siliceous materials is well known. More particularly, the use of furfuryl alcohol-derived resins as binders in fiber glass laminates is known. The furan resins have long been known for their excellent corrosion resistant properties, excellent resistance to heat, and unusual smoke resistance.

Thermosetting resins such as phenolic resins, melamine resins, urea-formaldehyde resins, furan resins, and modifications thereof, particularly with furfuryl alcohol; are widely used as binders for casting sand to make cores and molds. These binders have several disadvantages which develop in the casting process. The chief limitation is that the cores are lacking in strength, and are brittle; therefore, often the core or mold is broken during the casting process. These binders also provide cores with poor humidity resistance.

It has also been known that aminoalkylsilanes such as those having the following general formula are effective as coupling agents to increase the structural strength of siliceous materials bound with thermosetting resins:

$$\text{Q}-\overset{\text{H}}{\underset{|}{\text{N}}}-\text{C}_n\text{H}_{2n}-\text{Si(OP)}_3$$

wherein $n$ is a whole integer; Q is a member of the class hydrogen and $H_2N-C_mH_{2m}$ wherein $m$ is a whole integer; and OP is a hydrolyzable group.

SUMMARY OF THE INVENTION

It is an object of this invention to provide a binder modified with a novel organosilane for binding siliceous materials.

The novelty of our invention lies chiefly in the use of a specific organosilane. This silane can be graphically depicted by the following formula:

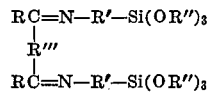

wherein R is a monovalent hydrocarbon radical free of aliphatic unsaturation, or hydrogen; R' is a divalent aliphatic hydrocarbon radical; OR" is a hydrolyzable group and R" is alkyl, aryl, heterocyclic, and substituted derivatives thereof; and R''' is a divalent hydrocarbon radical free of aliphatic unsaturation.

It has been found most unexpectedly that the above organosilane when used in thermosetting resins is effective as an adhesion promoter in spite of the absence of a reactive amino group.

The monovalent hydrocarbon radicals free of aliphatic unsaturation which constitute R in the above formula representing the organosilanes of this invention are illustrated by alkyl groups, such as methyl, ethyl, propyl, isopropyl, butyl, isobutyl, amyl, hexyl, and the like; aryl groups, such as phenyl, naphthyl, and the like; alicyclic groups, such as cyclopentyl, cyclohexyl, and the like; aralkyl groups, such as benzyl, phenylethyl, and the like; alkaryl groups, such as ethylphenyl and dimethylphenyl.

The divalent aliphatic hydrocarbon radicals which constitute R' in the above mentioned formula are alkylene radicals of the formula $C_nH_{2n}$ where $n$ is an integer between 3 and 9 inclusive. Branched chain as well as straight chain alkylene radicals are also useful, however, R' must always be such that the imine group is interconnected to the silicon through at least three carbon atoms.

In the readily hydrolyzable OR" group suitable alkyl R" groups include for example methyl and ethyl. Suitable aryl R" groups are for example phenyl, o-chlorophenyl, and p-chlorophenyl. Suitable heterocyclic R" groups comprise for example furfuryl and tetrahydrofurfuryl.

The divalent hydrocarbon radicals free of aliphatic unsaturation which constitute R''' are illustrated by alkylene radicals and arylene radicals. The alkylene radicals preferably contain from 1 to 5 carbon atoms, but longer chains can be used if desired. Suitable alkylene radicals include both straight and branched chain. Examples of R''' alkylene radicals are:

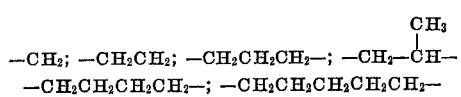

and the like. Suitable arylene radicals include for example phenylene and napthalene.

The organosilanes used in the binder and process of this invention are prepared by contacting a dialdehyde or diketone and an aminoalkylsilane. Examples of suitable diketones include acetonylacetone and acetylacetone. Suitable dialdehydes include for example terephthaldehyde, napthaldehyde, and pentanedial. Examples of suitable aminoalkylsilanes are gamma-aminopropyltriethoxysilane, gamma - aminopropyltrimethoxysilane, gamma-aminopropyriphenoxysilane, gamma - aminopropyltribenzyloxysilane, gamma-aminopropyltrifurfuroxysilane, gamma-aminopropyltri(o-chlorophenoxy)silane, gamma - aminopropyltri(p-chlorophenoxy)silane, and gamma-aminopropyltri(tetrahydrofurfuroxy)silane.

The aminoalkylsilane starting material is prepared by disclosed methods known to those in the art. The dialdehyde or diketone, the other starting material, is known and can be prepared by known methods.

The compositions of our invention are produced by forming a mixture of the aminoalkylsilane compound with the dialdehyde or diketone and maintaining the mixture at a temperature at which the aminoalkylsilane and dialdehyde or diketone will react. The reaction results in water and an organosilicon compound comprising N,N'-bis[(tri(substituted))-silylalkylene]-1,4-R'''-diimine wherein the imine group is interconnected to the silicon atom through at least three carbon atoms and R''' is a divalent hydrocarbon radical free of aliphatic unsaturation.

Exemplary organosilanes of this invention include the following:

N,N'-bis[(triethoxy)silylpropyl]-1,4-xylene-α,α'-diimine
N,N'-bis[(trimethoxy)silylpropyl]-1,4-xylene-α,α'-diimine
N,N'-bis[(triphenoxy)silylpropyl]-1,4-xylene-α,α'-diimine
N,N'-bis[(tribenzyloxy)silylpropyl]-1,4-xylene-α,α'-diimine
N,N'-bis[(trifurfuroxy)silylpropyl]-1,4-xylene-α,α'-diimine
N,N'-bis[(tri(o-chlorophenoxy))silylpropyl]-1,4-xylene-α,α'-diimine
N,N'-bis[(tri-p-chlorophenoxy))silylpropyl]-1,4-xylene-α,α'-diimine
N,N'-bis[(tri(p-chlorophenoxy))silylpropyl]-1,4-xylene-α,α'-diimine
N,N'-bis[(triethoxy)silylpropyl]-pentane-2,4-diimine
N,N'-bis[(triphenoxy)silylpropyl]-pentane-2,4-diimine
N,N'-bis[(tribenzyloxy)silylpropyl]-pentane-2,4-diimine
N,N'-bis[(trifurfuroxy)silylpropyl]-pentane-2,4-diimine
N,N'-bis[(tri(o-chlorophenoxy))silylpropyl]-pentane-2,4-diimine
N,N'-bis[tri(p-chlorophenoxy))silylpropyl]-pentane-2,4-diimine
N,N'-bis[(tri(p-chlorophenoxy))silylpropyl]-pentane-2,4-2,4-diimine
N,N'-bis[(triethoxy)silylpropyl]-hexane-2,5-diimine
N,N'-bis[(trimethoxy)silylpropyl]-hexane-2,5-diimine
N,N'-bis[(triphenoxy)silylpropyl]-hexane-2,5-diimine
N,N'-bis[(tribenzyloxy)silylpropyl]-hexane-2,5-diimine
N,N'-bis[(trifurfuroxy)silylpropyl]-hexane-2,5-diimine
N,N'-bis[(tri(o-chlorophenoxy))silylpropyl]-hexane-2,5-diimine
N,N'-bis[(tri(p-chlorophenoxy))silylpropyl]-hexane-2,5-diimine
N,N'-bis[(tri(tetrahydrofurfuroxy))silylpropyl]-hexane-2,5-diimine The relative amounts of the aminoalkylsilane and the dialdehyde or diketone, the above mentioned starting materials, is not narrowly critical and can be varied over a wide range. A ratio of amino nitrogen of the aminoalkylsilane to carbonyl group of the dialdehyde or diketone of at least 1 to 1 is advantageous. No commensurate advantage is gained by using relative amounts other than those described above.

The temperature at which the reaction takes place also is not narrowly critical and can vary from as low as 0° C. to as high as 250° C. It is preferred, however, to carry out the reaction at a temperature of from about 5° C. to 150° C.

The reaction is preferably carried out in a suitable solvent in which both the aminoalkylsilane and the dialdehyde or diketone are soluble, said solvent being nonreactive therewith. Solvents that are miscible with water are preferred, for example, cyclic ethers such as tetrahydrofuran and dioxane, since said water miscible solvents minimize the hydrolysis of the above described OR'' groups by the water formed in the reaction.

The amount of solvent or even the presence of solvent is not critical. Amounts of such solvents of from 10 parts to about 400 parts by weight of the organosilicon compound containing the aminoalkylsilane and the dialdehyde or diketone starting materials can be employed. Amounts of such solvents other than those described can be used, but no commensurate advantage is gained thereby. The novel organosilanes described above are particularly useful as adhesion promoters between siliceous materials and thermosetting resins. Examples of siliceous materials include for example fiber glass, silica, silica flour, clay, and sand. All of these materials are well known in the art and are useful in the manufacture for example of foundry cores, resin concrete, coatings and fiber glass laminates. Thermosetting resins which can be used for example are phenolic resins, melamine resins, urea-formaldehyde resins, epoxy resins, and furan resins. Useful furan resins include the product obtained either from the self-condensation of furfuryl alcohol or from the condensation of furfuryl alcohol with furfural. Besides these furan resins other resins incorporating furan derivatives such as furfural-phenol resins, furfuryl alcohol-phenol resins, furfuryl alcohol-formaldehyde resins, and furfuryl alcohol-formaldehyde-urea resins are also useful. We also mean by thermosetting furan resins those furan resins which can cure at room temperature as well as at elevated temperatures in the presence of an acid catalyst. For example, monomeric furan binder comprising furfuryl alcohol, urea, and formaldehyde.

About 0.01 to about 0.5 part by weight of the organosilanes described above are blended with a thermosetting resin to provide the modified binders of this invention. While more organosilane can be used, it is not considered economical to do so.

The preferred furan resin when modified with the above specified organosilane for fiber glass laminates comprises a homogeneous mixture of:

(a) A furfuryl alcohol formaldehyde resin having a viscosity between 5,000 and 200,000 cps., said resin having been prepared by the steps of acid resinification of furfuryl alcohol and formaldehyde in a molar ratio of between 0.25 and 1.0 moles of formaldehyde per mole of furfuryl alcohol, preferably between 0.5 and 1.0 molar ratio neutralizing the catalyst and removing substantially all of the water produced by said acid resinification, and (b) Furfural in an amount between 5 and 25 percent preferably between 10 and 20 percent by weight based on the weight of the composition, said binder composition, having a viscosity between 200 and 5,000 cps. at 77° F., preferably between 500 and 3,000 cps.

The step of acid resinification to produce the furfuryl-formaldehyde resin is in the presence of conventional acid catalysts. Suitable acid catalyst include inorganic and organic acids such as hydrochloric acid, sulfur acid, nitric acid, orthophosphoric acid, benzene sulfonic acid, toluene sulfonic acid, naphthalene sulfonic acid, benzoic acid, salicylic acid, acetic acid, propionic acid, maleic acid, oxalic acid, malonic acid, phthalic acid, lactic acid, and citric acid. Suitable acid catalysts also include Friedel-Crafts type catalysts such as ferric chloride, aluminum chloride, zinc chloride, and ammonium chloride. Suitable acid catalysts include organic acid anhydrides such as maleic anhydride, succinic anhydride, and glutaric anhydride. Examples of satisfactory conventional acid catalysts include mineral acid salts of urea, thiourea, substituted ureas such as methyl urea, acetyl urea, benzoyl urea, phenyl thiourea, etc.; mineral acid salts of other members of the urea system, e.g., guanidine, creatine, guanoline, etc.; mineral salts of ethanol amines such as mono-, di-, and tri-ethanolamine; and mineral acid, salts of amines such as methyl amine, trimethyl anine, aniline, benzylamine, morpholine, etc.

The preferred furan resin when modified with the above organosilane for resin concrete comprises a monomeric binder mixture of from 99½ percent to 99⅞ percent by weight of monomeric furfuryl alcohol and from ½ percent to ⅛ percent by weight of the above organosilane. The furan resin may also contain from 2 percent to 10 percent by weight of aqueous urea-formaldehyde mixture and wherein said aqueous urea-formaldehyde contains from about 5 percent to about 25 percent by weight of water.

Aqueous urea-formaldehyde is a non-polymerized aqueous mixture of formaldehyde, urea, and equilibrium products which are believed to exist in equilbria as follows:

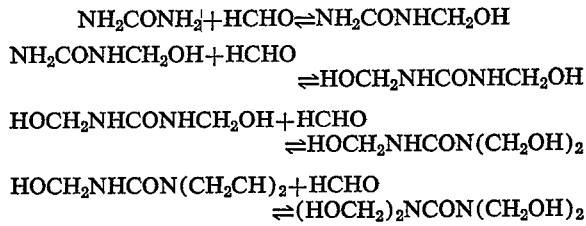

the above equilibria illustrate what is meant by the phrase "a non-polymerized aqueous mixture of formaldehyde, urea, and equilibrium reaction products thereof," which is herein claimed as an aqueous urea-formaldehyde mixture. Those urea molecules in the equilibria shown above that have more than one methylol radical attached are sometimes referred to as polymethylol ureas. There is difficulty encountered in distinguishing between the different polymethylol ureas in the aqueous urea-formaldehyde mixtures. For this reason the composition of the aqueous urea-formaldehyde solution is reported in terms of the weight percent urea and formaldehyde. A typical analysis of Allied Chemical's aqueous urea-formaldehyde mixture ("U.F. Concentrate–85") shows 59 percent by weight formaldehyde, 26 percent by weight urea, and about 15 percent by weight water.

Another aqueous urea-formaldehyde mixture is made by E. I. du Pont de Nemours and Company, Wilmington, Del., and is marketed as "Urea-Formaldehyde 25–60." Other examples of aqueous urea-formaldehyde mixtures are "Sta-Form 60" by Georgia-Pacific Company, Portland, Oreg., "UF-85" and "UF-78" by Borden Chemical Division, Borden, Inc., New York, N.Y., "Agrimine" by Reichhold Chemical, Inc., White Plains, N.Y., "Formourea 60" by Montecatini Edison of Italy, and "Formal 55" by Badische Anilin-& Soda-Fabrik of Germany.

The preferred furan resin modified with the organosilane of this invention for use in foundry cores comprises a mixture of from 2 percent to 10 percent by weight of aqueous urea-formaldehyde mixture; from 97⅛ percent to 89½ percent by weight of furfuryl alcohol, said aqueous urea-formaldehyde mixture containing from about 5 percent to about 25 percent by weight of water; and from ⅛ percent to ½ percent by weight of the organosilanes of this invention.

The modified binder of this invention is catalyzed and contacted with the siliceous material. The acid catalyst may be acid catalysts identical to those specified above. The amount of the catalyst used will vary with the amount of thermosetting resin used, the type of thermosetting resin, the type of siliceous material used, and the curing time desired. For example, sand with a high clay content and fiber glass may have a high acid demand and require more acid catalyst. In general, the more catalyst the more rapid the cure. It is usually undesirable to have too rapid a cure since the workable life of the modified binder will be too short. The amount of catalyst for the preferred modified binders is given below. For other thermosetting resin binders modified with the organosilanes of this invention and used for a particular application, the amount of catalyst can be easily determined by one skilled in the art. The preferred acid catalyst for a particular thermosetting resin can also be easily determined by one skilled in the art.

When the preferred fiber glass laminating furan resin is used, the binder of this invention is admixed with between 2 and 7 percent by weight based on the weight of the binder of an acid.

When the preferred furan resin for resin concrete or for foundry cores is used, the acid catalyst is present in amount from 5 percent to 50 percent by weight of the binder.

The amount of modified binder depends on the siliceous material used and the application of the bound material. The amount is not narrowly critical but it is preferred to use about 0.5 to 5 parts by weight based on the weight of the siilceous material. When sand is used for resin concrete, it is preferred to use from 2 to 20 percent by weight of binder based on the weight of the sand.

Fiber glass laminates, resin concrete, and core compositions are made from the modified binders of this invention by methods well-known in the art. Exemplary procedures are set forth in the examples.

DESCRIPTION OF THE PREFERRED EMBODIMENTS

The following embodiments of this invention are shown for the purpose of illustrating the invention and demonstrating the best mode for practicing the invention. It will be apparent to those skilled in the art that various changes and modifications may be made therein without departing from the spirit and scope of the invention as it is more precisely defined in the subjoined claims.

EXAMPLE 1

6.7 grams of terephthaldehyde (0.05 mole) was placed in a 3-necked boiling flask equipped with a reflux condenser, thermometer, and dropping funnel and containing 150 ml. of absolute ethanol. The contents of the flask were warmed to dissolve the terephthaldehyde.

Over a period of 25 minutes, 22.1 grams (0.1 mole) of gamma-aminopropyltriethoxysilane were added to the above mixture which was held at 25° C.

The reaction mixture was then refluxed at 80° C. for 2 hours. The mixture was then distilled under reduced pressure (3.5 mm. Hg) to remove the volatile solvent and the water, a product of the reaction.

After the volatiles had been distilled off, the remaining material was N,N'-bis[(triethoxy)silylpropyl]-1,4-xylene-$\alpha,\alpha'$-diimine. The infrared spectrum showed an imine group at 1648 cm.$^{-1}$ and no carbonyl group at 1695 cm.$^{-1}$. Terephthaldehyde has a carbonyl group at 1695 cm.$^{-1}$. On analysis the product was found to contain 57.78 percent by weight of carbon, 9.21 percent by weight hydrogen, and 5.27 percent by weight of nitrogen. The theoretical composition of N,N'-bis[(triethoxy)propylsilyl]-1,4-xylene-$\alpha,\alpha'$-diimine is 57.74 percent by weight of carbon, 8.95 percent by weight of hydrogen, and 5.18 percent by weight of nitrogen.

EXAMPLE 2

About 0.1 mole of gamma-aminopropyltriethoxysilane was placed in a 100 ml. 3-necked boiling flask containing 0.47 mole of benzyl alcohol and a few boiling chips. The flask was equipped with a nitrogen inlet, thermometer, and a total reflux head fraction cutter protected with a drying tube containing anhydrous calcium sulfate.

The contents of the flask were then heated for 2 to 4 hours with condensation and under a continuous nitrogen purge. The temperature of the contents of the flask rose from 35° C. to about 200° C. over the 2 to 4 hour period.

At the end of this period, some ethanol had collected in the distillate flask. A slight vacuum was then applied to the contents of the reaction mixture and gradually increased until all the ethanol and unreacted benzyl alcohol had been stripped off. The resultant product which was left in the reaction flask was gamma-aminopropyltribenzyloxysilane.

Following the procedure of Example 1 but using the gamma-aminopropyltribenzyloxysilane prepared above, N,N' - bis[(tribenzyloxy)silylpropyl] - 1,4 - xylene-$\alpha,\alpha'$-dimine was prepared. The product on analysis was found to contain 73.90 percent by weight of carbon, 6.87 percent by weight of hydrogen, and 3.20 percent by weight of nitrogen. This compared to the theoretical composition by weight of 73.64 percent carbon, 6.62 percent hydrogen, and 3.07 percent nitrogen.

EXAMPLE 3

Aminosilanes from various hydroxy compounds and gamma-aminopropyltriethoxysilane were prepared following the procedure of Example 2. Equivalent amounts of the hydroxy compound given in Table I were substituted for benzyl alcohol. The percentage composition of the product aminosilanes as compared to the theoretical composition is reported in Table I.

TABLE I

| Test | Hydroxy compound | Ratio of percent by weight composition of product to theoretical composition | | |
| --- | --- | --- | --- | --- |
| | | Carbon | Hydrogen | Nitrogen |
| 1 | Phenol | 68.35/69.01 | 6.46/6.34 | 3.9/3.83 |
| 2 | p-Chlorophenol | 53.41/53.80 | 4.35/4.30 | 3.11/2.99 |
| 3 | o-Chlorophenol | 54.51/53.80 | 4.60/4.30 | 3.02/2.99 |
| 4 | Furfuryl alcohol | 57.14/57.27 | 6.36/6.14 | 3.91/3.71 |

Using the procedure of Example 1 but substituting the product aminosilanes prepared above, respectively; the following organosilanes are prepared:

N,N'-bis[(triphenoxy)silylpropyl]-1,4-xylene-$\alpha,\alpha'$-diimine

N,N'-bis[(tri(p-chlorophenoxy))silylpropyl]1,4-xylene-$\alpha,\alpha'$-diimine

N,N'-bis[(tri(o-chlorophenoxy))silylpropyl]1,4-xylene-$\alpha,\alpha'$-diimine

N,N'-bis[trisfurfuroxysilylpropyl)]-1,4-xylene-$\alpha,\alpha'$-diimine

EXAMPLE 4

Using the procedure of Example 1 but substituting an equivalent amount of 2,5-hexanedione for the terephthaldehyde; N,N' - bis[(triethoxy)silylpropyl] - hexane-2,5-diimine was prepared. The product on analysis was found to contain 55.86 percent by weight of carbon, 9.96 percent by weight of hydrogen, and 5.60 percent by weight of nitrogen. This compared to the theoretical composition by weight of 55.34 percent carbon, 10.06 percent hydrogen, and 5.38 percent nitrogen.

Following the procedure of Example 1 but using gamma-aminopropyltrifurfuroxysilane in place of gamma-aminopropyltriethoxysilane and using 2,4-pentanedione in place of terephthaldehyde; N,N'-bis[(trifurfuroxy)silylpropyl]-pentane-2,4-diimine was prepared.

EXAMPLE 5

A furan fiber glass laminating resin was prepared as follows: Furfuryl alcohol (198 parts by weight), formaldehyde (40.7 parts by weight of a solution consisting of 39 parts by weight of formaldehyde, 12 parts by weight of methanol, and 49 parts by weight of water), and oxalic acid (0.78 part by weight of a solution consisting of 10 parts weight of oxalic acid in 90 parts by weight of water) were mixed at room temperature in a 15-gallon stainless steel kettle equipped with a steam jacket, thermometer well, and reflux condenser. The pH of the resulting solution measured 1.95. The batch was heated over a period of 60 minutes to a temperature of 90° C., at which point reflux began. At this point the hot cup viscosity as measured by a Cenco consistency cup No. 27145 was 37 seconds. The batch refluxed at 98–100° C. until the hot cup viscosity was about 41 seconds. The resin was immediately neutralized 0.39 part by weight of triethanolamine and cooled. The pH was 6.2. The batch was distilled at temperatures up to 120° C. and pressures down to 50 mm. of mercury. The viscosity of the resin at 25° C. was then 12,000 centipoises (cps.). After dilution with 28 parts by weight of furfural, a viscosity of 400 cps. was obtained.

Using the laminating resin prepared above, two fiber glass laminates were prepared as follows: A long sheet of polyethylene terephthalate was laid out on a flat working surface. In Test 5 the resin prepared above was catalyzed with 4 percent by weight catalyst solution based on the weight of the resin and was applied to a sheet of glass cloth which had been heat cleaned. The catalyst solution was 50 percent by weight of p-toluene sulfonic acid in 35 percent by weight of methanol and 15 percent by weight of water. The glass cloth was worked into the wet resin using a conventional resin roller. The steps of spreading the resin, laying a sheet of glass cloth, and rolling the resin was repeated four more times to provide a 6-ply laminate. A thin top layer of resin was added to the uppermost resin wetted glass cloth. The sample of Test 5 was cured for 16 hours at about 27° C. and then for 3 hours at 180° F. The measured physical properties of the laminate is reported below in Table II.

Test 6 was prepared as Test 5 except that 1 percent by weight of N,N'-bis[(triethoxy)silylpropyl]-1,4-xylene-$\alpha,\alpha'$-diimine based on the weight of the resin was added to the resin. The measured physical properties of the laminate prepared in this test is also given in Table II.

TABLE II

| Test | Flexural strength, p.s.i. | Modulus, p.s.i. | Percent elongation |
| --- | --- | --- | --- |
| 5 | 17,539 | 492,398 | 3.57 |
| 6 | 41,788 | 1,304,038 | 3.19 |

The flexural strength, modulus, the elongation were measured throughout the examples with an Instron Tester Model TT–D.

EXAMPLE 6

The same procedure and laminating resin as in Example 4, Test 5, was used in Test 7 except that 1 percent by weight of N,N'-bis[(triethoxy)silylpropyl]-hexane-2,5-diimine based on the weight of the resin was added to the resin. The flexural strength of the laminate was 44,399 p.s.i.; the modulus 1,457,743 p.s.i., and the elongation 3.05 percent.

EXAMPLE 7

Fiber glass laminates are prepared by imbedding layers of fiber glass on an acid curable thermosetting binder modified with from 0.01 to 0.5 part by weight of N,N'-bis[(triethoxy)silylpropyl] - 1,4 - xylene-$\alpha,\alpha'$-diimine; and subsequently curing the binder composition. The thermosetting binder may be a phenolic resin, melamine resin, urea formaldehyde resin, epoxy resin, or a furan resin.

In each case, the fiber glass laminate prepared with a thermosetting resin modified by the above silane will have superior flexural strength to a fiber glass laminate prepared from a comparable unmodified binder.

EXAMPLE 8

In Test 8, 600 grams of a mixture of foundry sands were blended with 5 mls. of 70 percent p-toluene. 36 grams of a binder which comprised 92 percent by weight of furfuryl alcohol and 8 percent by weight "U.F. Concentrate–85" was added to the acid-sand mixture. After a homogeneous mixture was attained, the mix was formed into tensile strength and specimen with an American Foundrymen's Society Standard Specimen Container and Rammer. The tensile strength of the specimen after curing for 5 days under ambient conditions was determined with an Instron Tester Model TT–D. The average tensile strength of the specimen was 1068 p.s.i.

Test 9 was made in an identical manner to Test 1 except for the addition of 0.09 grams of N,N'-bis[(triethoxy)-silylpropyl]-1,4-xylene-$\alpha,\alpha'$-diimine. The average tensile strength of the specimen was 1990 p.s.i.

EXAMPLE 9

In each of the following tests, a quantity was weighed and set aside. Next a quantity of furfuryl alcohol binder equal to 2 percent by weight of the silica sand was weighed and set aside. The furfuryl alcohol binder comprised a mixture of 91.9 percent by weight of furfuryl alcohol, 8 percent by weight of "U.F. Concentrate-85," and 0.1 percent by weight of the organosilane specified in Table III below.

An 85 percent by weight solution of phosphoric acid in water equal to 25 percent by weight of the furfuryl alcohol binder was mixed with the silica sand. After the sand and acid were thoroughly mixed, the furfuryl alcohol binder was then thoroughly mixed in.

The life of the core is given in Table III. The life is the number of minutes in which it takes greater than six compressions on a sample to achieve the same compressed length as three compressions of the sample would originally achieve.

Cores were made from the above core mixture, allowed to cure at ambient temperatures for 2 to 3 hours, then placed at 93 percent relative humidity overnight, cores from the various tests were found to have the tensile strength reported in Table III.

TABLE III

| Test | Organosilane | Tensile strength (p.s.i.) | Life (min.) |
|---|---|---|---|
| 10 | None | 50 | 27 |
| 11 | A* | 420 | 25 |
| 12 | B* | 360 | 25 |
| 13 | C* | 360 | 27 |
| 14 | D* | 410 | 25 |

NOTE.—A* is N,N'-bis[(triphenoxy)silylpropyl]1,4-xylene-α,α'-diimine; B* is N,N'-bis[(trifurfuroxy)silylpropyl]-pentane-2,4-diimine; C* is N,N'-bis[(tribenzyloxy)silylpropyl]-1,4-xylene-α,α'-diimine; D* is N,N-bis[(tri-o-chlorophenoxy)silylpropyl]-1,4-xylene-α,α'-diimine.

The above examples clearly demonstrate the accomplishment of this invention. In Examples 1-4, inclusive, methods of preparing the organosilanes used to modify the binders of this invention are demonstrated.

In Example 5, Test 5, a fiber glass laminate using a furan laminating resin was found to have a flexural strength of 17,539 p.s.i. and a modulus of 492,396. In Test 6 when 1 percent by weight of N,N'-bis[(triethoxy)silylpropyl] - 1,4 - xylene - α,α' - diimine was added to the furan laminating resin, the fiber glass laminate had a surprising increase in flexural strength to 41,788 p.s.i. and an increase in modulus to 1,304,038 p.s.i. as compared to the laminate of Test 5. Test 5 is not in accordance with this invention but is an example of a fiber glass laminate made with a laminating resin which does not contain the organosilanes used in this invention. Test 6 is in accord with this invention.

Example 6 is similar to Example 5 except that a different organosilane of this invention was used. As in Example 4, the addition of the organosilanes used in this invention resulted in a tremendous increase in flexural strength.

Example 7 is an illustration of the use of various thermosetting resins modified with the organosilanes of this invention as fiber glass laminating resins. In every case, the modified resin imparted superior structural strength to the fiber glass laminate as compared with a laminate made with a laminating resin containing no organosilane.

In Example 8, resin concrete from a monomeric furfuryl alcohol binder in Test 8 was found to have a tensile strength of 1068 p.s.i. When 0.09 grams of N,N'-bis[(triethoxy)silylporpyl] - 1,4 - xylene - α,α' - diimine was added to the above binder in Test 9, the tensile strength of the resin concrete was found to be 1990 p.s.i. Test 9 is in accord with this invention. Test 8 is not in accord with this invention but was prepared as an example of a binder which does not contain the organosilane of this invention. The tremendous increase in tensile strength from 1068 p.s.i. to 1990 p.s.i. clearly demonstrates the exceptional usefulness of the organosilanes of this invention.

In Example 9, foundry cores were made with the modified binders of this invention in Tests 11-14, inclusive. Test 10 was not in accord with this invention but was prepared to show a binder which does not contain the organosilanes of this invention. Tests 11-14, inclusive, demonstrate the surprising increase in tensile strength of the modified binders of this invention when compared to the unmodified binder of Test 10.

From the foregoing description we consider it to be clear that the present invention contributes a substantial benefit to the art by providing new and useful thermosetting resins modified with new organosilanes.

We claim:

1. An acid curable binder for use with siliceous materials comprising: a mixture of 99.5 to 99.99 parts by weight of a thermosetting resin and 0.5 to 0.01 part by weight of an organosilane of the formula:

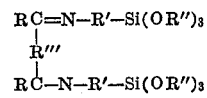

wherein R is a hydrogen or a monovalent hydrocarbon radical free of aliphatic unsaturation; R' is a divalent aliphatic hydrocarbon radical and wherein the imine group is interconnected to the silicon atom through at least three carbon atoms; R" is alkyl, aryl, or heterocyclic; and R''' is a divalent hydrocarbon radical free of aliphatic unsaturation.

2. The binder of claim 1 wherein said thermosetting resin is a furan resin.

3. The binder of claim 1 wherein the organosilane is a N,N' - bis[(triethoxy)silylporpyl] - 1,4 - xylene - α,α'-diimine.

4. The binder of claim 1 wherein the organosilane is N,N'-bis[(triethoxy)silylpropyl]-pentane-2,4-diimine.

5. The binder of claim 1 wherein the organosilane is N,N'-bis[(triethoxy)silylpropyl]-hexane-2,5-diimine.

6. The binder of claim 1 wherein said thermosetting resin comprises a homogeneous mixture of:
   (a) a furfuryl alcohol-formaldehyde resin having a viscosity between 10,000 and 200,000 said resin having been prepared by the steps of acid resinification of furfuryl alcohol and formaldehyde in a molar ratio of between 0.25 and 1.0 mole of formaldehyde per mole of furfuryl alcohol, neutralizing the catalyst and removing substantially all the water by distillation, and
   (b) furfural in an amount between 5 and 25 percent by weight based on the total weight of said homogeneous mixture, said homogeneous mixture having a viscosity between 300 and 5,000 cps. at 77° F.

7. The binder of claim 1 comprising from 99½ percent to 99⅞ percent by weight of monomeric furfuryl alcohol and from ½ to ⅛ percent by weight of said organosilane.

8. The binder of claim 7 wherein from 2 to 10 percent by weight of aqueous urea-formaldehyde mixture containing from about 5 percent to about 25 percent by weight of water is substituted for part of the furfuryl alcohol.

References Cited

UNITED STATES PATENTS

| 3,429,848 | 2/1969 | Robins | 260—38 |
| 3,360,492 | 12/1967 | Tsou | 260—DIG 40 |
| 3,428,110 | 2/1969 | Walker et al. | 260—DIG 40 |
| 3,487,043 | 12/1969 | Grudus | 260—37 R |

LEWIS, T. JACOBS, Primary Examiner

U.S. Cl. X.R.

260—37 R, 41 R, 88.3

PO-1050
(5/69)

UNITED STATES PATENT OFFICE
CERTIFICATE OF CORRECTION

Patent No. 3,681,287     Dated August 1, 1972

Inventor(s) Lloyd H. Brown, Andrew P. Dunlop, and Daniel S.P. Eftax

It is certified that error appears in the above-identified patent and that said Letters Patent are hereby corrected as shown below:

Column 3, line 26 "N, N'-bis[(tri-p-chlorophenoxy))silylpropyl]-1,4-xylene-α,α'-diimine" should read --N,N'-bis[(tri(p-chlorophenoxy))silylpropyl]-1,4-xylene-α,α'-diimine--. Column 3, line 28 "N,N'-bis[(tri(p-chlorophenoxy))silylpropyl]-1,4-xylene-α,α'-diimine" should read --N,N'-bis[(tri(tetrahydrofurfuroxy))silylpropyl]-1,4-xylene-α,α'-diimine--. Column 3, line 39 "N,N'-bis[(tri(p-chlorophenoxy))silylpropyl]-pentane-2,4-2,4-diimine" should read --N,N'-bis[(tri(tetrahydrofurfuroxy))silylpropyl]-pentane-2,4-diimine--. Column 9, line 67 "N,N'-bis[(triethoxy)silylporpyl]-1,4-xylene-α,α'-diimine" should read --N,N'-bis[(triethoxy)silylpropyl]-1,4-xylene-α,α'-diimine--. Column 10, line 20 the formula should read

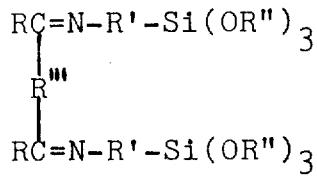

Column 10, line 35 "N, N'-bis[(triethoxy)silyporpyl]-1,4-xylene-α,α'-diimine" should read --N,N'-bis[(triethoxy)silylpropyl]-1,4-xylene-α,α'-diimine.

Signed and sealed this 8th day of May 1973.

(SEAL)
Attest:

EDWARD M. FLETCHER, JR.
Attesting Officer

ROBERT GOTTSCHALK
Commissioner of Patents